United States Patent [19]
Pomerantz

[11] Patent Number: 5,491,563
[45] Date of Patent: Feb. 13, 1996

[54] APPARATUS FOR SCRAMBLING AND UNSCRAMBLING DOCUMENTS

[75] Inventor: Yitzchak Pomerantz, Kfar Saba, Israel

[73] Assignee: Aliroo Ltd., Kfar Saba, Israel

[21] Appl. No.: 442,636

[22] Filed: May 17, 1995

Related U.S. Application Data

[63] Continuation of Ser. No. 131,326, Oct. 4, 1993, abandoned, which is a continuation-in-part of PCT/US93/00959, filed Feb. 3, 1993.

[30] Foreign Application Priority Data

Feb. 4, 1992 [IL] Israel ........................................ 100863
Aug. 2, 1993 [IL] Israel ........................................ 106567

[51] Int. Cl.$^6$ ....................................................... H04N 1/44
[52] U.S. Cl. .......................... 358/405; 358/406; 358/453; 380/18
[58] Field of Search ............................ 358/400, 403–406, 358/434, 440, 442, 451–453; 380/14, 18, 20–21, 54–55; H04N 1/44

[56] References Cited

U.S. PATENT DOCUMENTS

| | | | |
|---|---|---|---|
| 2,437,255 | 3/1948 | Hogan et al. .................................. | 35/4 |
| 2,940,005 | 6/1960 | Toulon ....................................... | 315/21 |
| 3,830,964 | 8/1974 | Spencer ....................................... | 178/6 |
| 3,958,077 | 5/1976 | Ross et al. ................................... | 178/6 |
| 4,070,693 | 1/1978 | Shutterly ..................................... | 358/123 |
| 4,091,423 | 5/1978 | Branscome . | |
| 4,134,133 | 1/1979 | Teramura ................................ | 358/261 |
| 4,459,611 | 7/1984 | Arai et al. . | |
| 4,989,244 | 1/1991 | Naruse et al. . | |
| 5,001,750 | 3/1991 | Kato et al. . | |
| 5,027,401 | 6/1991 | Soltesz . | |
| 5,062,136 | 10/1991 | Gattis et al. . | |
| 5,086,434 | 2/1992 | Abe et al. . | |
| 5,159,630 | 10/1992 | Tseng et al. . | |
| 5,166,977 | 11/1992 | Ross . | |
| 5,222,136 | 6/1993 | Rasmussen et al. . | |
| 5,233,653 | 8/1993 | Katsurabayashi . | |
| 5,255,106 | 10/1993 | Castro . | |
| 5,321,749 | 6/1994 | Virga . | |
| 5,331,424 | 7/1994 | Matsui et al. ........................... | 358/404 |
| 5,331,431 | 7/1994 | Jasinski . | |

FOREIGN PATENT DOCUMENTS 4-154273  5/1992  Japan .

OTHER PUBLICATIONS

Manual of Photogrammetry, pp. 441–445.

Primary Examiner—Kim Yen Vu
Attorney, Agent, or Firm—Ladas & Parry

[57] ABSTRACT

Apparatus for scrambling documents including apparatus for providing output signals representing the contents of a document, apparatus for operating on the output signals to produce modified output signals representing a scrambled version of the document including a system of reference marks to be used during later descrambling for registration, scaling, rotation, shifting and defect compensation and writing apparatus receiving the modified output signals and producing a scrambled version of the document.

22 Claims, 15 Drawing Sheets

FIG. 5A
This is a demostration
of the validation of
descrambling through
correlation between
neighboring pixels
— 91
FIG. 5B
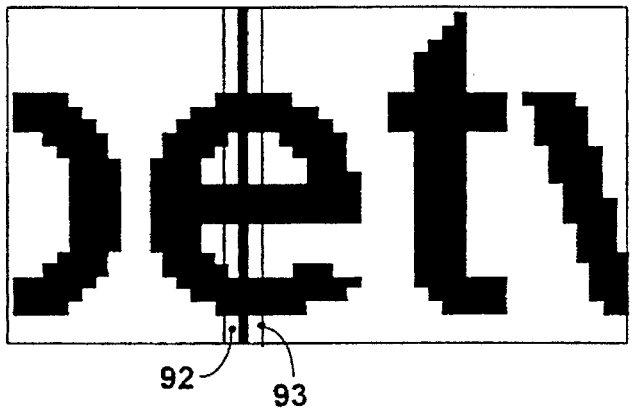
92 — 93
FIG. 5C
Th demos is is a ration
    valida of th tion of
de bling th scram rough
    tion b correl tween
    boring neig pixels
                — 94
FIG. 5D
96 — 96
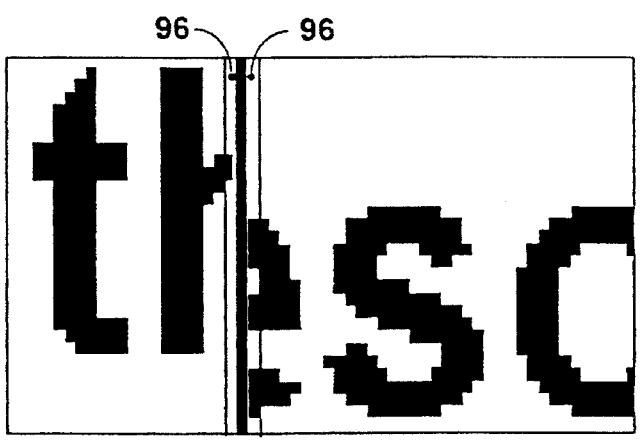

$$\overline{V} = d3 \times d2 \times \overline{V1} / d12 / d13 +$$
$$d1 \times d3 \times \overline{V2} / d12 / d23 +$$
$$d1 \times d2 \times \overline{V3} / d13 / d23$$

APPARATUS FOR SCRAMBLING AND UNSCRAMBLING DOCUMENTS

This is a continuation of application Ser. No. 08/131,326 filed on Oct. 4, 1993, abandoned, which is a continuation-in-part of application PCT/US93/00959 filed Feb. 3, 1993.

FIELD OF THE INVENTION

The present invention relates to creation and transmission of confidential documents.

BACKGROUND OF THE INVENTION

There has long existed a need for secure handling of confidential documents. It is well known to protect information for transmission along unprotected channels by scrambling or enciphering the information upon transmission and descrambling or deciphering the information upon receipt, using a common secret key which is known both to the transmitter and recipient.

Modern telefax machines such as the NTTFAX-43 of NTT, Japan, offer protection for confidential transmissions by locking confidential transmitted messages in the receiving machine and releasing them only in response to an appropriate access code which identifies the intended recipient.

Automatic scrambling systems for documents are described, for example, in "A confidential message handling facility for facsimile communication" by Tominaga et al, in Transactions of the Institute of Electronics and Communication Engineers of Japan, November 1982, the disclosure of which is hereby incorporated by reference. In such systems, scrambling is carried out on electrical signals bearing the confidential information. Once the document appears in a hard-copy format, it is no longer protected.

U.S. Pat. No. 4,459,611 describes a method for scrambling and descrambling of documents, by dividing their area into sub-areas and shuffling the sub-areas according to a random key. The same key is employed for reconstructing the original document in a descrambling function. In order for descrambling to take place, the scrambled document is placed on a scanner for image digitization of the scanned image.

U.S. Pat. No. 4,459,611 fails to take into account significant differences between the scrambled image as created by the scrambler and the scanned image, as the result of handling of the hard copy of the scrambled image.

These differences may include the following:

1. Dislocation and rotation of the image due to poor alignment of the scrambled document on the scanner;
2. Shrinkage or expansion of the image due to humidity and temperature effects on the hard copy of the scrambled image.
3. Distortion of the image due to optical errors in copying machines that may have been used to copy the scrambled image.
4. Missing horizontal rows in the image due to loss of synchronization during fax transmission
5. Loss of data on the scrambled image due to erasing, stains, folds, and tears that may have occurred on the hard copy.

U.S. Pat. No. 4,459,611 suggests that alignment registration marks be employed to ensure precise alignment of the scrambled document on the scanner. This solution is not, however, practical, due, inter alia to the following reasons:

a. The required alignment accuracy is typically $\frac{1}{250}$ of an inch, which is not normally realized in an office environment.
b. No solution is provided for errors outside of the vicinity of the alignment registration marks.
c. Loss of any of the registration marks may render descrambling impossible.

U.S. Pat. No. 4,989,244 describes a method for encrypting fax communications. The method requires that a matching key be used by both sending and receiving fax terminals in real time.

U.S. Pat. No. 5,062,136 describes a method for encrypting graphic image communication between video terminals. In this method, the image is always represented by a synchronized electronic signal and distortions like dislocation, rotation, shrinking or erasing do not occur.

U.S. Pat. No. 4,091,423 describes a scrambling system suitable for protecting facsimile communication. This method requires a real time handshake between transmitting and receiving stations and cannot be applied to ordinary fax machines without the addition of additional hardware.

U.S. Pat. No. 5,027,401 describes a method for encrypting an image into an alphanumeric (rather than graphical) representation. This method is practical for small images and to stiff and solid record material, such as ID cards.

SUMMARY OF THE INVENTION

The present invention seeks to provide improved apparatus for handling confidential information in hard copy format.

There is thus provided in accordance with a preferred embodiment of the present invention apparatus for scrambling documents including apparatus for providing output signals representing the contents of a document, apparatus for operating on the output signals to produce modified output signals representing a scrambled version of the document including a system of reference marks to be used during later descrambling for at least one of registration, scaling, rotation, shifting and defect compensation and generator apparatus receiving the modified output signals and producing a scrambled version of the document.

It is to be appreciated that references to "a system of reference marks" or the like or to "a system of targets" are intended to include, as well, a single distributed reference mark, such as a grid.

There is also provided in accordance with a preferred embodiment of the present invention apparatus for descrambling documents including a scanner receiving a document to be unscrambled and providing output signals representing the graphical contents of the document, apparatus for operating on the output signals to produce modified output signals representing a unscrambled version of the document, the apparatus for operating employing said system of reference marks for at least one of registration, scaling, rotation, shifting and defect compensation and generator apparatus receiving the modified output signals and producing a unscrambled version of the document.

In accordance with a preferred embodiment of the present invention the apparatus for operating is controlled by a coded input to provide a selected one from s plurality of possible modifications to the output signals.

Additionally in accordance with a preferred embodiment of the invention, the apparatus is embodied in a photocopier.

Further in accordance with a preferred embodiment of the invention, the apparatus is embodied in a telefax.

Additionally in accordance with a preferred embodiment of the invention, the apparatus is embodied in a computer.

Additionally in accordance with a preferred embodiment of the present invention the apparatus for operating is operative to change the relative positions of multi-pixel regions of a document, without modifying the information content within each of the multi-pixel regions.

Further in accordance with a preferred embodiment of the present invention, the apparatus for operating is operative to leave unchanged certain predetermined regions of the document.

Additionally in accordance with a preferred embodiment of the present invention, the apparatus for providing includes a scanner receiving a document to be scrambled and providing output signals representing the contents of the document.

Further in accordance with a preferred embodiment of the invention, verification of correct descrambling is provided. Such verification may be carried out by the use of a registration area in the document or by edge correlation operations on adjacent scrambled pixels.

Throughout the specification and claims, the term "scrambling" is used in an extremely broad sense, to include any suitable reordering of the information in the document. Scrambling may include encryption, but need not involve encryption.

Preferably the reference marks are distributed throughout the area of the document.

Alternatively the reference marks are distributed about the periphery of the area of the document.

In accordance with a preferred embodiment of the present invention, the correct location of each of the reference marks can be determined by its appearance.

Preferably, the reference marks are characterized by a local color modification reversal of the image information thereat.

In accordance with one embodiment of the invention, the reference marks define a frame around a scrambled area.

Preferably, the correct location of each of the reference marks is indicated by the pattern of the frame.

Alternatively, the reference marks are arranged in a predetermined grid.

BRIEF DESCRIPTION OF THE DRAWINGS

The present invention will be more fully appreciated from the following detailed description, taken in conjunction with the drawings in which:

FIGS. 5A, 5B, 5C and 5D are illustrations of validation of descrambling in accordance with a preferred embodiment of the present invention;

DETAILED DESCRIPTION OF A PREFERRED EMBODIMENT

Figure 1:
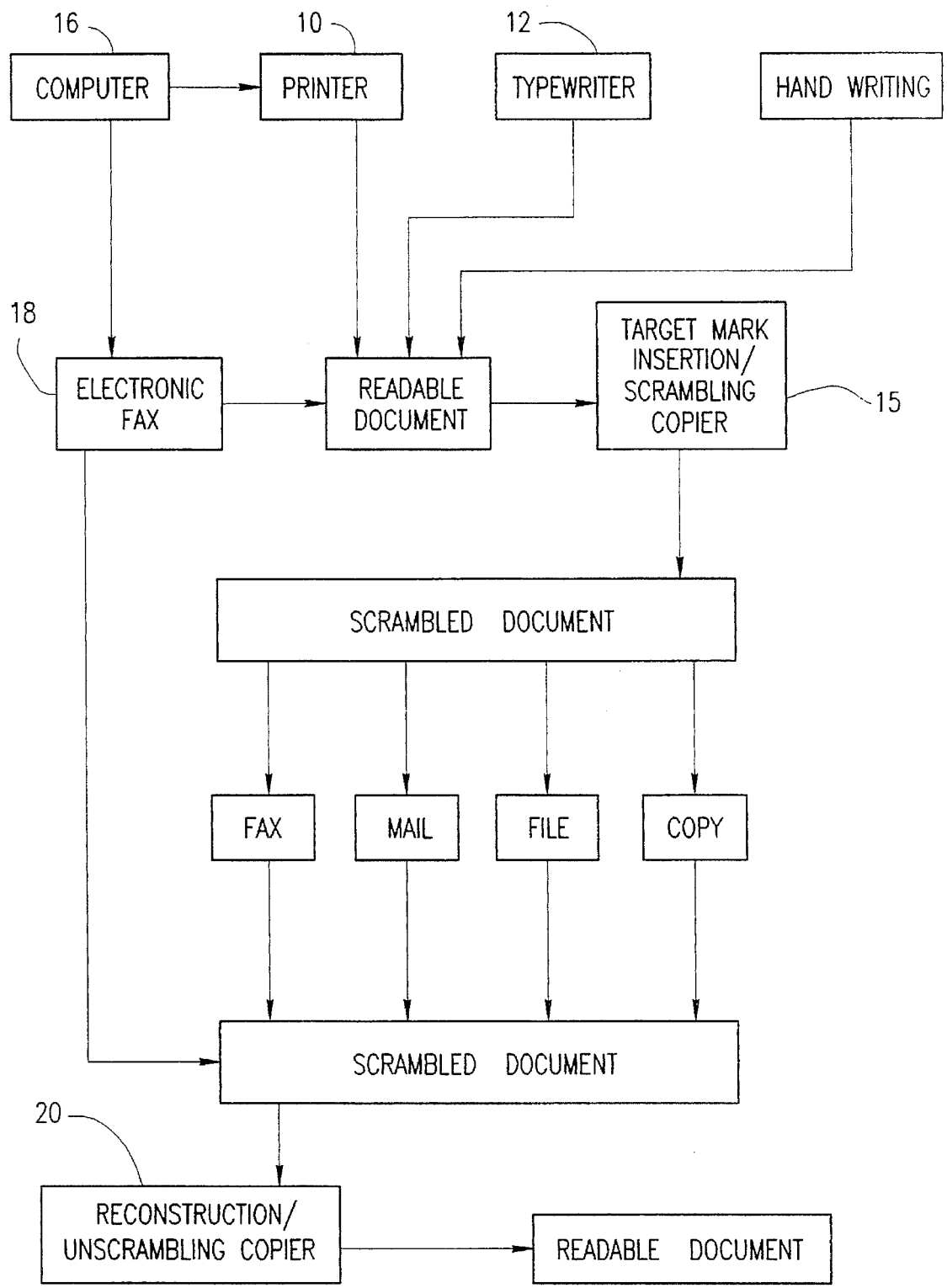
FIG. 1 is a generalized illustration of apparatus for creating and transmitting scrambled documents constructed and operative in accordance with a preferred embodiment of the present invention.

Reference is now made to FIG. 1, which is a generalized illustration of apparatus for creating and transmitting scrambled documents constructed and operative in accordance with a preferred embodiment of the present invention. Ordinary, conventional office machines, such as a computer printer 10 and a typewriter 12 may provide a hard copy document, which alternatively may be handwritten. The document is readable by any person without required authorization and is normally human-readable.

In accordance with a preferred embodiment of the present invention, the hard copy document is provided to a scrambling copier 15, preferably a modified version of a digital copying machine such as a Canon 8580, which is capable of scanning hard copy documents into its memory and then printing them to make copies. In accordance with a preferred embodiment of the present invention, the digital copying machine is modified to scramble the contents of the hard copy document which is stored in its memory in accordance with a predetermined scrambling protocol, an example of which is described hereinbelow.

Additionally in accordance with a preferred embodiment of the present invention, the scrambling copier is also operative to distribute a system of mutually location coordinated reference marks, hereinafter "targets" in the scrambled imagine to assist in later reconstruction of a scrambled image which has undergone distortion.

Alternatively, a computer generated document may be transmitted directly from a computer 16 via an electronic fax machine 18, such as a fax modem, which generates a readable document which is supplied to the scrambling copier 15.

As will be described hereinbelow, the scrambling copier 15 provides a scrambled hard copy document, which can be handled in any conventional office procedure, such as copying, filing, mailing and faxing, without having the information contained therein disclosed to an unauthorized reader.

An authorized reader can, at any time, take the scrambled document, or a copy thereof and "copy" it on an descrambling copier 20 and thus turn it into an ordinarily, human readable document.

Unscrambling copier 20 is preferably a digital copying machine such as a Canon 8580, which is capable of scanning scrambled hard copy documents into its memory and then printing them to make unscrambled, preferably human readable, copies. In accordance with a preferred embodiment of the president invention, the digital copying machine is modified to unscramble the contents of the hard copy document which is stored in its memory in accordance with a predetermined descrambling protocol, an example of which will be described hereinbelow, and which is the inverse of the scrambling protocol used to scramble the document.

Additionally in accordance with a preferred embodiment of the present invention, the descrambling copier is also operative to identify the mutually location coordinated targets in the scrambled image and to use them in reconstruction of a scrambled image which has undergone distortion.

It will be appreciated that preferably the scrambling copier 15 and the descrambling copier 20 are respectively capable of scrambling and descrambling a document in a multiplicity of different ways, which are selected by the input of a given code to the copier. The scrambling and descrambling codes may need to be known to both the transmitter or recipient and may be configured in accordance with any suitable known scrambling and encryption technique. Alternatively, if a public key is used, the recipient need not know the scrambling code.

Figure 2:
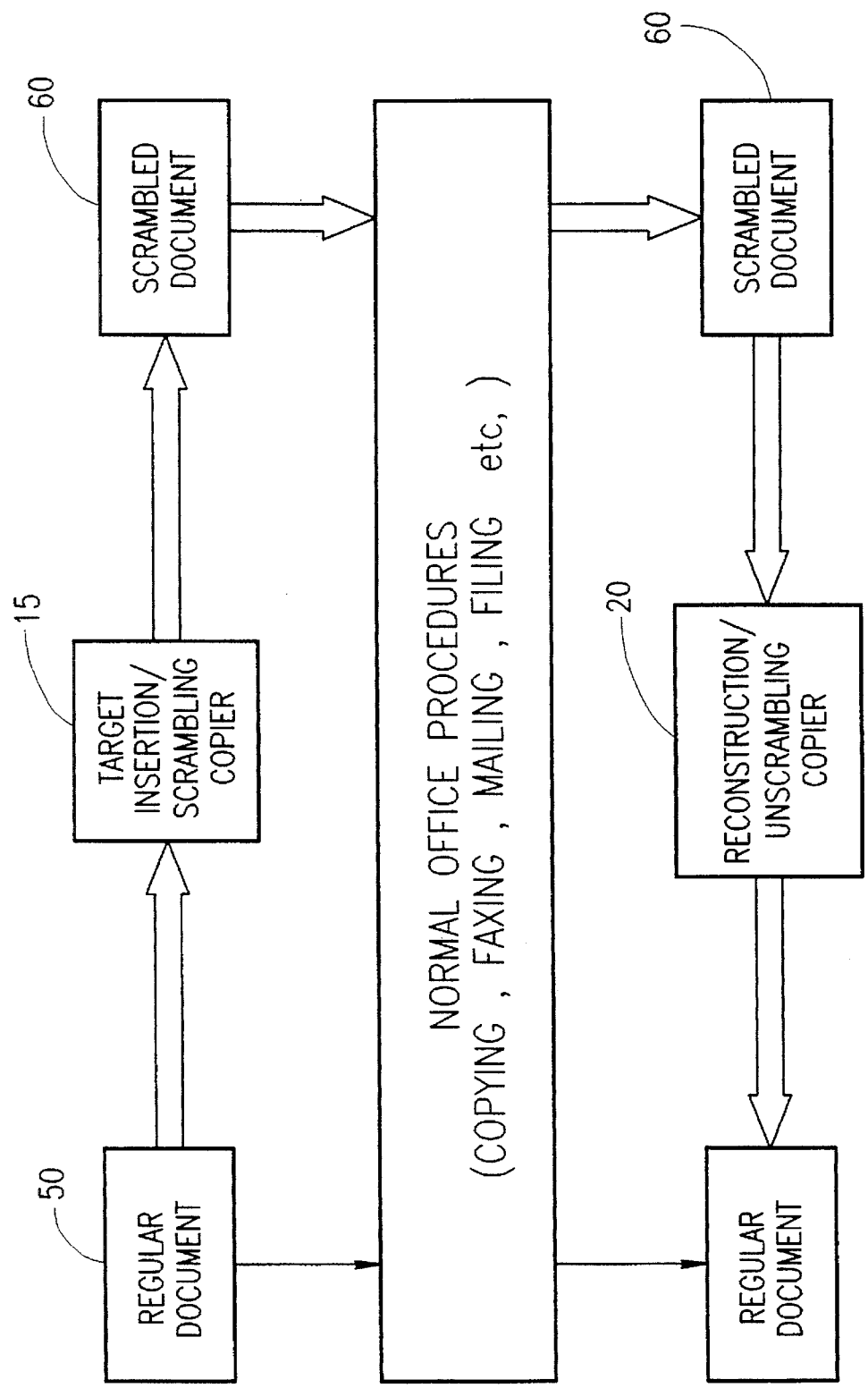
FIG. 2 is a generalized illustration of "paper flow" in accordance with a preferred embodiment of the present invention.

FIG. 2 graphically illustrates a dual paper flow path in a typical office environment in accordance width the present invention. A regular document 50 is dealt with in an entirely normal way in all normal office procedures, such as copying, faxing, mailing and filing. If such a document is desired to be maintained confidential, it is copied on a target insertion/scrambling copier, such as an enciphering copier and is thus converted into an enciphered document 60 which cannot normally be read by a person. This enciphered document can be dealt with in all office procedures identically to the regular document, but cannot be read by unauthorized persons.

An authorized person receiving the enciphered document 60 and being in possession of an appropriate descrambling code may readily copy the enciphered document 60 on a reconstruction/descrambling copier 20, which may or may not be the same copier as scrambling copier 15 and may be remotely located therefrom. All that is required is that the descrambling copier 20 operate in an inverse manner to the operation of scrambling copier 15. The result of descrambling is a regular document, which may be entirely identical to original regular document 50 or may contain some indicia to indicate that it has undergone enciphering and deciphering.

In certain operations copiers 15 and 20 operate on fixed scrambling and descrambling protocols and thus do not require the application of scrambling and descrambling codes. Alternatively and preferably, the copiers 15 and 20 are capable of operation in a multiplicity of different scrambling and descrambling modes of operation, which are selectable by appropriate codes.

In accordance with one embodiment of the invention, the descrambling code, or part thereof may be carried by the document itself and may be readable by the descrambling copier. Any other suitable technique of transmitting descrambling code information may alternatively be employed.

Figure 3A:
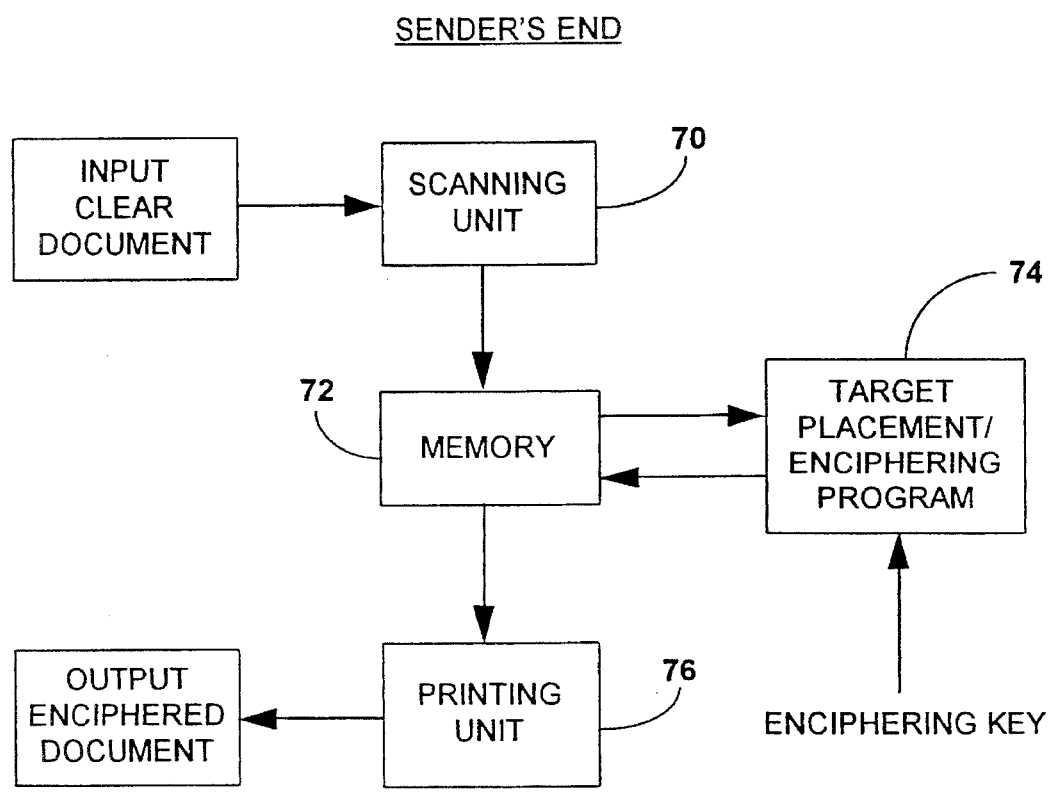
FIG. 3A and 3B are block diagram illustrations of the use of a digital copier in a preferred embodiment of the present invention.
Figure 3B:
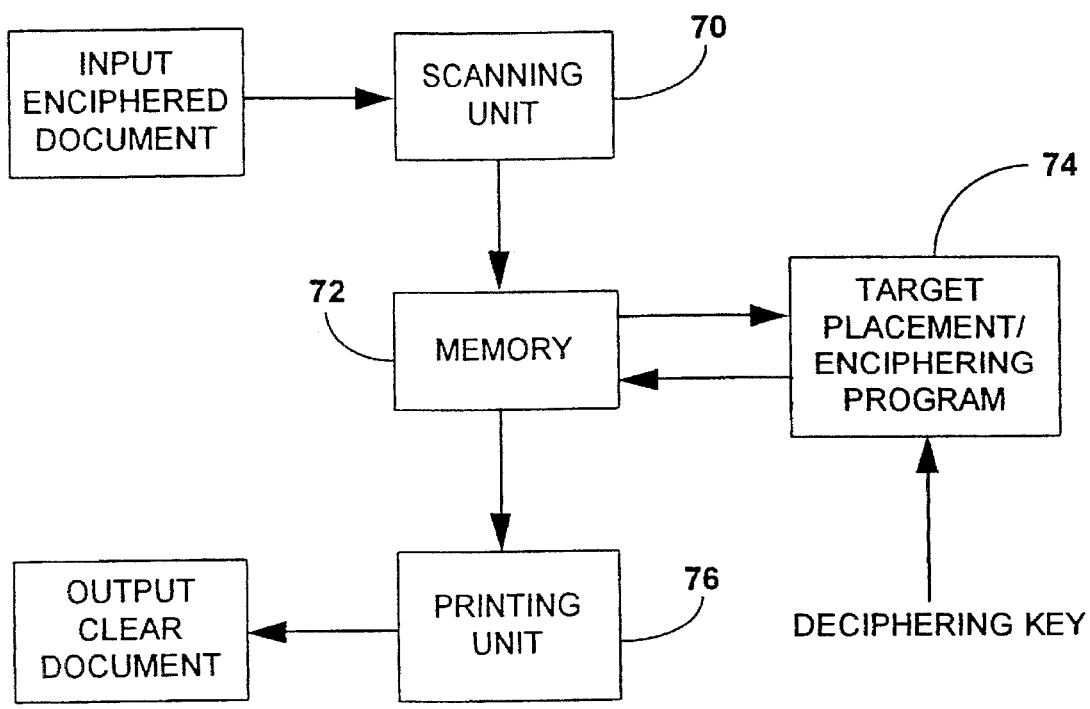
Figure 4A:
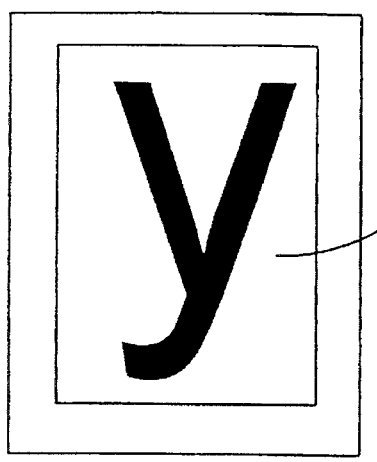
FIGS. 4A, 4B, 4C, 4D and 4E together constitute an illustration of one embodiment of target insertion and document scrambling useful in accordance with the present invention.
Figure 4B:
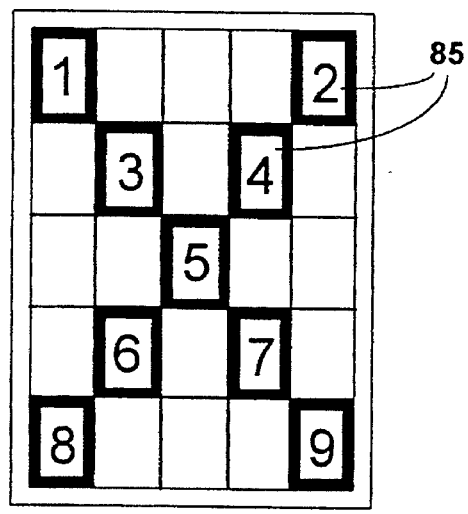
Figure 4C:
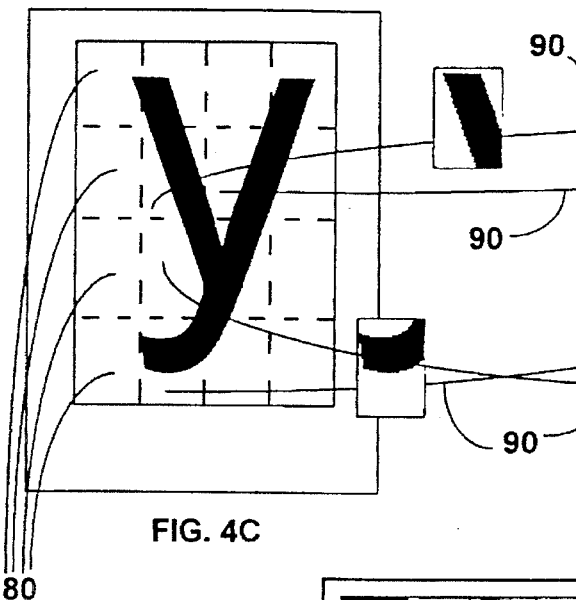
Figure 4D:
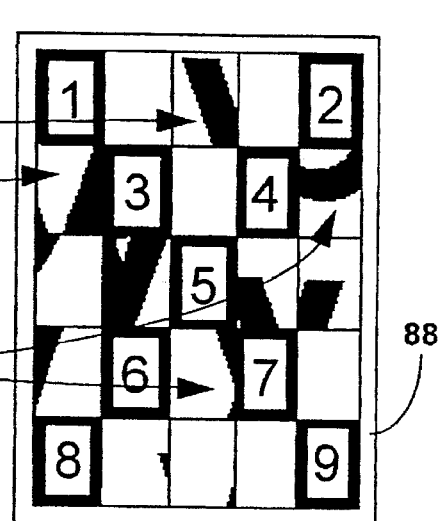
Figure 4E:
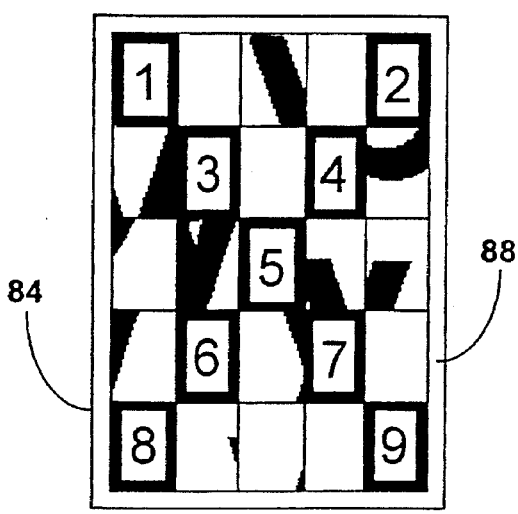

Reference is now made to FIGS. 3A and 3B, which illustrate the general structure of the scrambling and descrambling copiers 15 and 20. In each case, the copier comprises a document scanning unit 70 which outputs to a memory 72 which is interactively connected with a scrambling or descrambling program 74, which may be an enciphering or deciphering program, as appropriate, which is typically embodied on a VLSI chip and which outputs to a printing unit 76. Program 74 preferably provides target placement and document reconstruction functions as well.

At the scrambling or enciphering end (FIG. 3A), a human readable document is scanned by the scanning unit 70 and an enciphered document is produced by the printing unit 76. An enciphering key is provided to the enciphering program 74 for this purpose. At the descrambling or deciphering end (FIG. 3B), a scrambled document is scanned by the scanning unit 70 and a deciphered document is produced by the printing unit 76. A deciphering key is provided to the deciphering program 74 for this purpose.

FIGS. 4A–4E illustrate a typical target insertion and scrambling transformation wherein a multiplicity of multipixel areas 80, here termed "gixels", are transformed from their original relative spatial orientation on a human readable document 82 to a different, scrambled, relative spatial orientation on a scrambled document 84 which also includes target markings 85. The contours of the gixels are indicated herein as dotted lines, it being appreciated that such dotted lines do not have to appear on either the original or scrambled document. It is appreciated that within each gixel, the pixel arrangement is unscrambled.

In the illustrated embodiment, nine targets 85, marked 1–9 and having a predetermined spatial relationship therebetween are employed. Each target typically occupies a single gixel, causing the target inserted scrambled image of the 4×4 gixel human readable document 82 to have typically 5×5 gixels.

Preferably the size of the gixel can be selected by the user. Larger gixels provide a more readable scrambled document, thus enabling faster processing. Small gixels provide a more scrambled document which is harder to read, but requires more processing time. The minimum gixel size is a single pixel. Information regarding the gixel size can be incorporated as part of the scrambling code, or alternatively it may appear on an unscrambled part of the document or be ascertained empirically by an examination of a scrambled document.

Arrows 90 indicate a typical spatial transformation, it being appreciated that any suitable spatial transformation may alternatively be provided.

Preferably part of the document area is not scrambled. The unscrambled area normally contains information that is intended to be readable by all persons, such as the date, addressee, identification of the sender, company logo and general instructions on how to unscramble the document. The non-scrambled area may include a heading portion, as well as a peripheral edge strip 88.

The peripheral edge strip 88 and the contours of the gixels 80, indicated in dashed lines may provide a registration frame, which although it may be considered to be a single mark, actually is considered for the purposes of the invention as a system of reference marks. Alternatively, any other suitable registration marks may alternatively or additionally be provided. It is appreciated that the registration frame or other registration marks do not normally appear on the original document, but rather are added to the scrambled document by the scrambling program and removed by the descrambling program.

In accordance with a preferred embodiment of the present invention, verification of correct scrambling and descrambling is provided by the scrambling and descrambling copiers. As illustrated in FIG. 5, such verification can readily be performed by considering the edges of adjacent gixels to confirm matching between light and dark regions thereon. Conventional spatial correlation techniques may be employed for this purpose.

Reference is now made to FIGS. 5A–5D, which illustrate one technique of validation of correct descrambling.

FIGS. 5A and 5B illustrate a case of valid descrambling, in respective normal and enlarged views. The normal view illustrates the text divided into four gixels. FIG. 5B illustrates an enlarged part 91 of FIG. 5A, while lies along two adjacent gixels. It is noted that the two pixel lines 92 and 93 adjacent the border between adjacent gixels are identical or nearly identical.

FIGS. 5C and 5D illustrate a case of invalid descrambling, in respective normal and enlarged views. The normal view illustrates the text divided into four gixels. FIG. 5C illustrates an enlarged part 94 of FIG. 5C, while lies along two adjacent gixels. It is noted that the two pixel lines 95 and 96 adjacent the border between adjacent gixels are not even nearly identical. It is appreciated that when a gixel boundary falls on the edge of a character or image, there may be a difference between lines 92 and 93. The average correlation over an entire page should nevertheless provide a reasonably accurate indication of valid descrambling. Thus, by determining the correlation between pixel lines along the border between adjacent gixels, a measure of the accuracy of the achieved descrambling may be obtained.

Figure 6A:
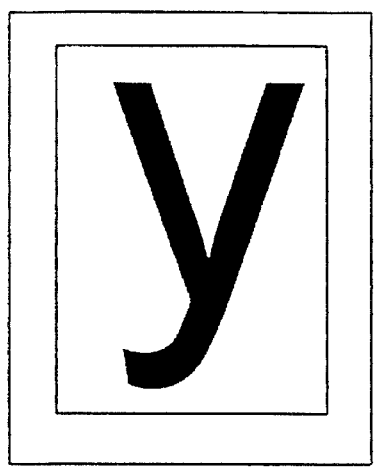
FIGS. 6A, 6B, 6C, 6D, 6E and 6F together constitute an illustration of target insertion, scrambling, reconstruction and descrambling in accordance with a preferred embodiment of the present invention.

Reference is now made to FIGS. 6A–6E, which illustrate the present invention in general terms. An original image is shown at FIG. 6A, it being appreciated that normally the original image may include a large multiplicity of alphanumeric symbols, images or the like.

Figure 6B:
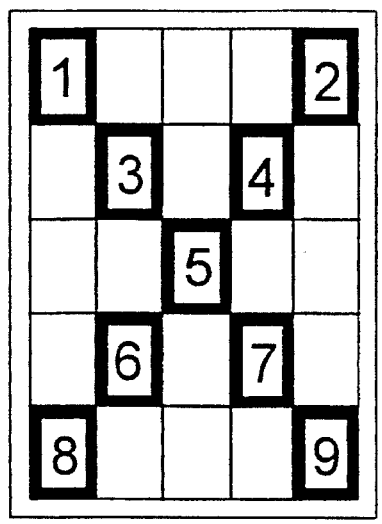
Figure 6C:
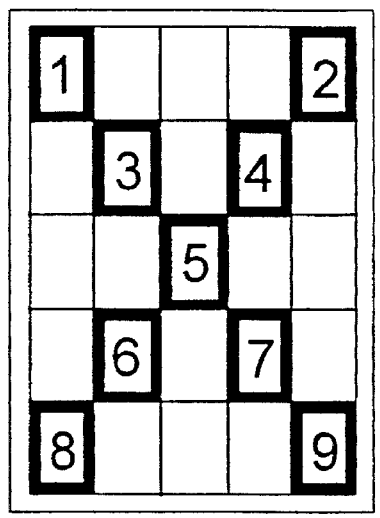
Figure 6D:
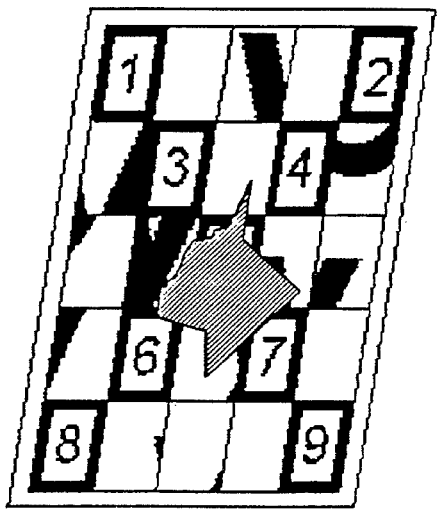

FIG. 6B illustrates a target map which typically includes nine target markings arranged in a predetermined arrangement. FIG. 6C illustrates a scrambled image having embedded therein target markings, preferably in the manner illustrated in FIGS. 4A–4E and described hereinabove.

The scrambled image of FIG. 6C is transmitted or handled in any usual manner, e.g. my mail, fax, etc and in the course of transmission is subjected to various distortions, including, for example, rotation and staining. A typical received document having some of these distortions appears in FIG. 6D.

Figure 6E:
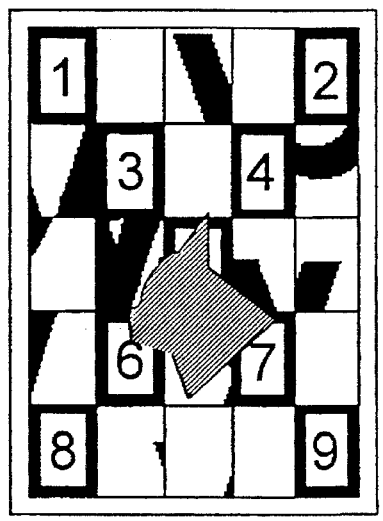
Figure 6F:
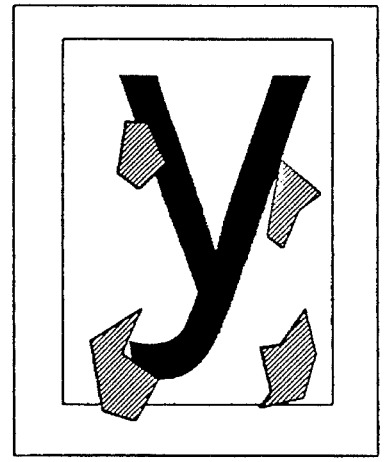

By employing the target markings, or targets, a receiving copier or other suitable apparatus provides reconstruction of the distorted scrambled image. The reconstructed scrambled, distorted image is shown in FIG. 6E. The reconstructed image is descrambled to produce the image of FIG. 6F.

The steps of target placement and reconstruction employing a rubber sheet mapping technique are summarized hereinbelow:

1. Placement of targets at predetermined locations throughout the scrambled image or about its periphery.
2. Upon reconstruction, for each target in the image to be reconstructed, calculate the X and Y error in location and prepare a list of vectorial errors for the targets.
3. For each pixel in the image to be reconstructed, find the N nearest targets. N can be any desired number the larger that N is, the more accurate is the reconstruction.
4. For each pixel calculate a weighted vector of error by adding the vectorial errors of the N nearest targets, each weighted according to its proximity to the pixel. The weighting function should be such that as the pixel approaches a target, its error vector converges to that of the target.
5. For each pixel of the reconstructed scrambled image, calculate the error vector, and read the value of the corresponding pixel from the distorted scanned image.

A computer program for scrambling, descrambling and verifying correct descrambling appears in Appendix A. This computer program can readily be incorporated in conventional digital photocopiers such as those mentioned hereinabove.

Reference is now made to FIGS. 7A, 7B, 7C and 7D, which together illustrate a process of descrambling an image suffering from three interrelated types of distortions: dislocation, later distortion and the presence of a large stain or erasure of information at a given location.

Figure 7A:
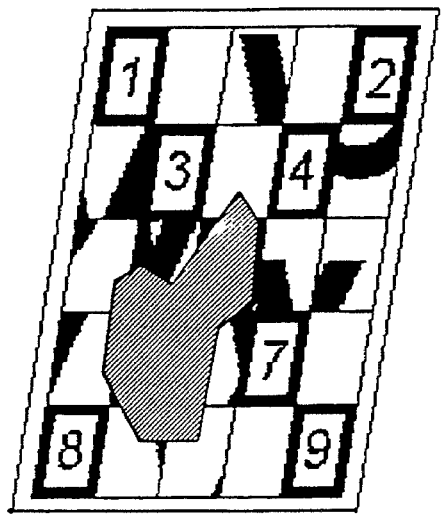
FIGS. 7A, 7B, 7C and 7D together illustrate reconstruction and descrambling of a received scrambled image suffering from dislocation, lateral distortion and the obliteration of part of the image.
Figure 7B:
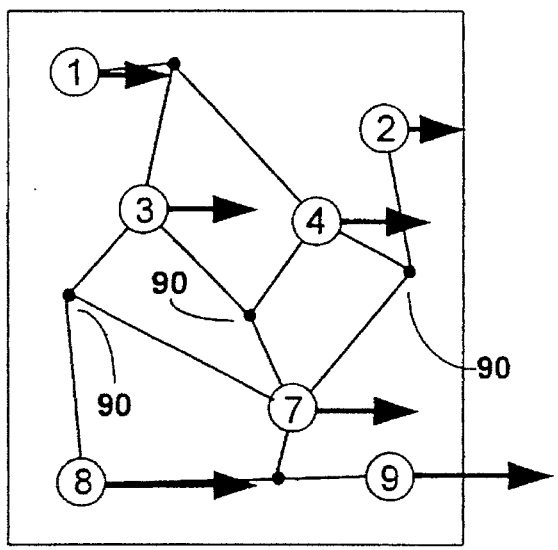

FIG. 7A illustrates a received scrambled image as scanned into descrambling apparatus. As seen in FIG. 7B, the targets are identified, it being noted that 2 of the typically 9 targets have been obliterated. The X and Y error vectors for each of the identified targets are determined.

A local error vector is assigned to every pixel in the image to be reconstructed, as discussed above and as exemplified in FIG. 8, discussed hereinbelow. In the illustrated embodiment, the error vector is determined by the three targets nearest to each pixel 90. Consideration of the distances to the neighboring targets and their error vectors provides local error vectors of each pixel according to the formula given in FIG. 8. It is appreciated that due to the obliteration of targets 5 and 6, the error vectors of the pixels adjacent thereto are based on relatively remote targets.

Figure 7C:
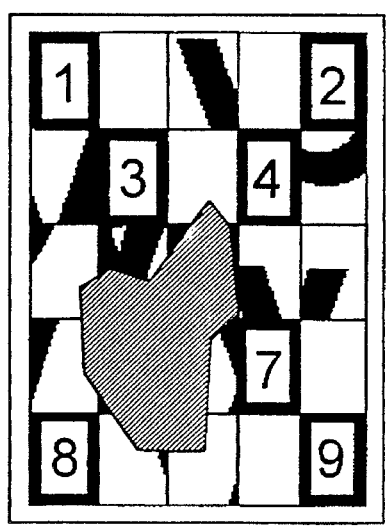

A reconstructed scrambled image produced by the foregoing reconstruction methodology is illustrated in FIG. 7C. It is noted that the sequence of pixels for calculation can be selected according to the order of the reconstructed image (pulling) or according to the order of the scanned image of FIG. 7A (pushing). It is appreciated in the art of raster image processing that pulling is preferred for ensuring that each pixel in the reconstructed image will be properly dealt with.

Figure 7D:
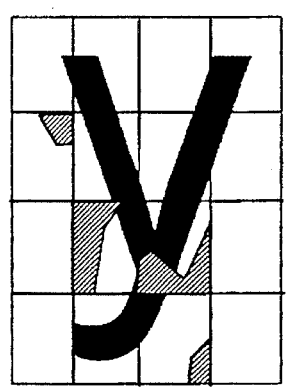

A descrambled image, corresponding to the reconstructed scrambled image of FIG. 7C, is shown in FIG. 7D. It is noted that the obliteration is now scattered over the descrambled image.

Figure 8:
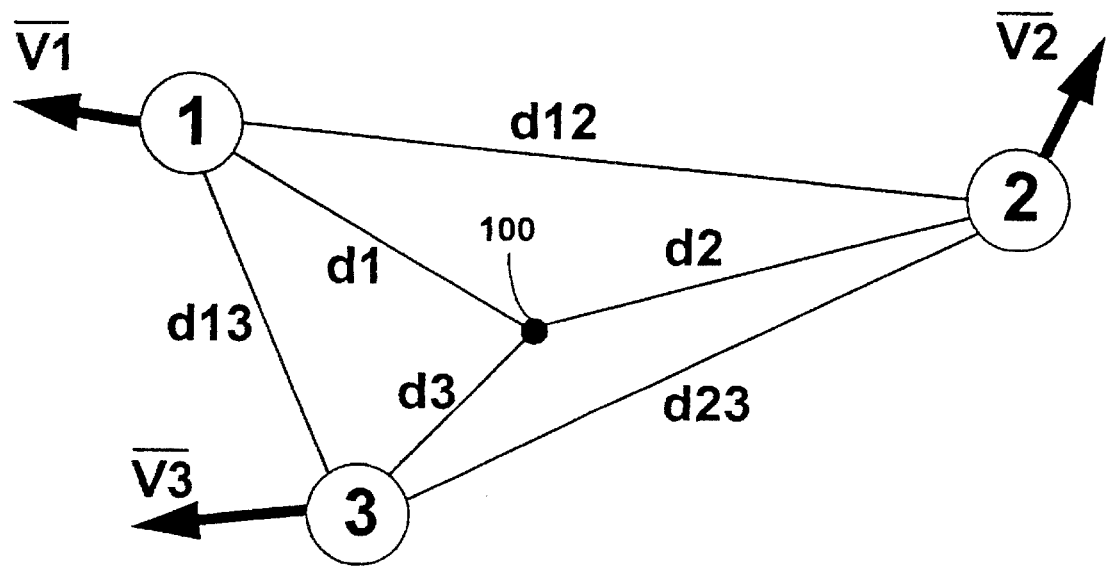
FIG. 8 is a diagram illustrating the computation of an error vector for a given pixel in accordance with a preferred embodiment of the present invention.

Reference is now made to FIG. 8, which illustrates one possible methodology for computing the error vector of a given pixel 100. In this case, the error vector is calculated employing the error vectors of the three nearest targets. It can be seen that as the pixel approaches any of the targets, Its error vector converges to the error vector of that target. For example, as the pixel 100 approaches target no. 2, the distances d1, d2 and d3 converge to d12, 0 and d23 and the vector V converges to V2.

It is appreciated that various other methodologies may be employed for this purpose using any number of targets. It has been found, however that using the three nearest targets enables every pixel of the image to be located inside one triangle of targets. The three vertices of the triangle represent points 1, 2 and 3 of the following formula:

$$V = d3 \times d2 \times V1/d12/d13 + \\ d1 \times d3 \times V2/d12/d23 + \\ d1 \times d2 \times V3/d13/d23$$

Figure 9A:
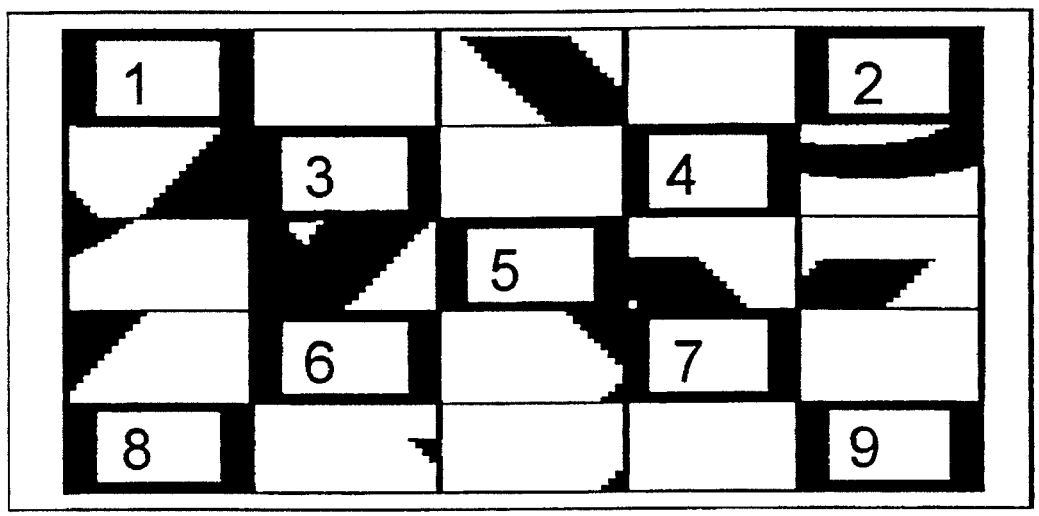
FIGS. 9A and 9B are illustrations of the reconstruction of a stretched image.
Figure 9B:
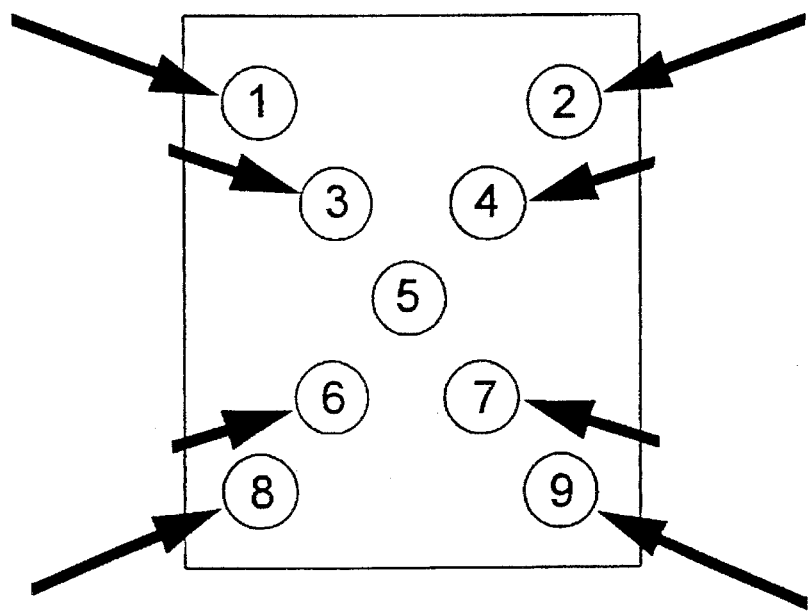

Reference is now made to FIGS. 9A and 9B, which illustrate the process of reconstruction of images having scale errors. In FIG. 9A, the scrambled image has been expanded horizontally and shrunk vertically.

As seen in FIG. 9B, the targets are identified and their error vectors are computed. It is noted that inasmuch as central target 5 is correctly placed, having a zero error vector, and thus indicates that displacement of the entire image is not present. The remainder of the descrambling of the image follows the techniques described hereinabove.

Figure 10A:
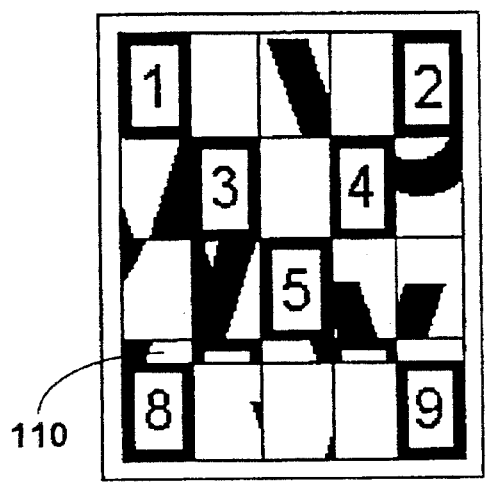
FIGS. 10A, 10B and 10C are illustrations of the reconstruction and descrambling of an image having a missing row or rows.
Figure 10B:
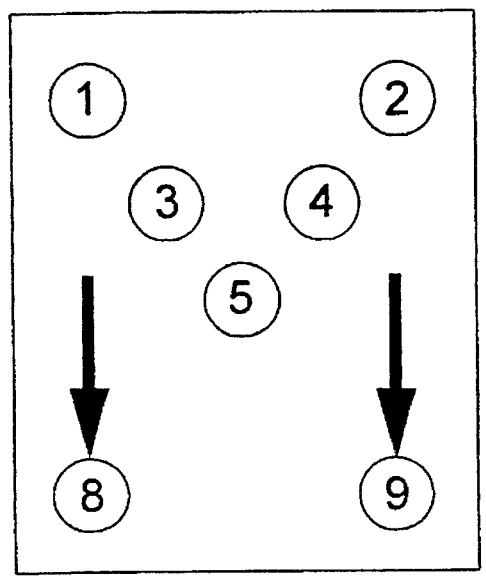
Figure 10C:
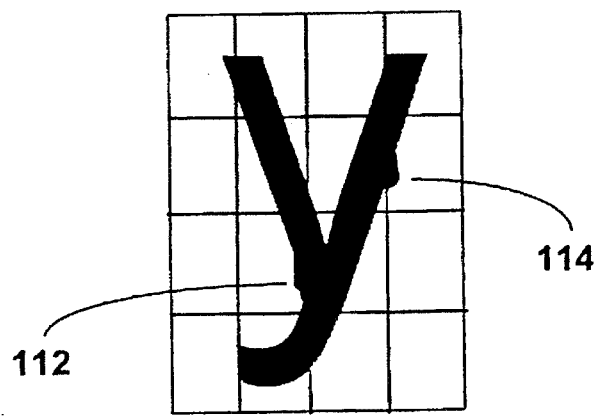

Reference is now made to FIGS. 10A, 10B and 10C, which illustrate the process of reconstruction and descrambling of images having lost rows, as occurs frequently in fax transmissions. FIG. 10A illustrates such an image wherein a significant portion of the image is lost, including most of the gixels adjacent targets 6 and 7.

As seen in FIG. 10B, the first steps are to identify the targets and to compute their error vectors. It is seen that targets 1–5 are in their correct places, but targets 8 and 9 have moved upward.

As seen in FIG. 10C, reconstruction of the image causes a strip 110 lying between target 5 and targets 8 and 9 in the distorted scrambled image of FIG. 10A to be vertically stretched to fill the gap between the targets. This causes local distortions in some gixels, as indicated by arrows 112 and 114 in FIG. 10C.

Figure 11:
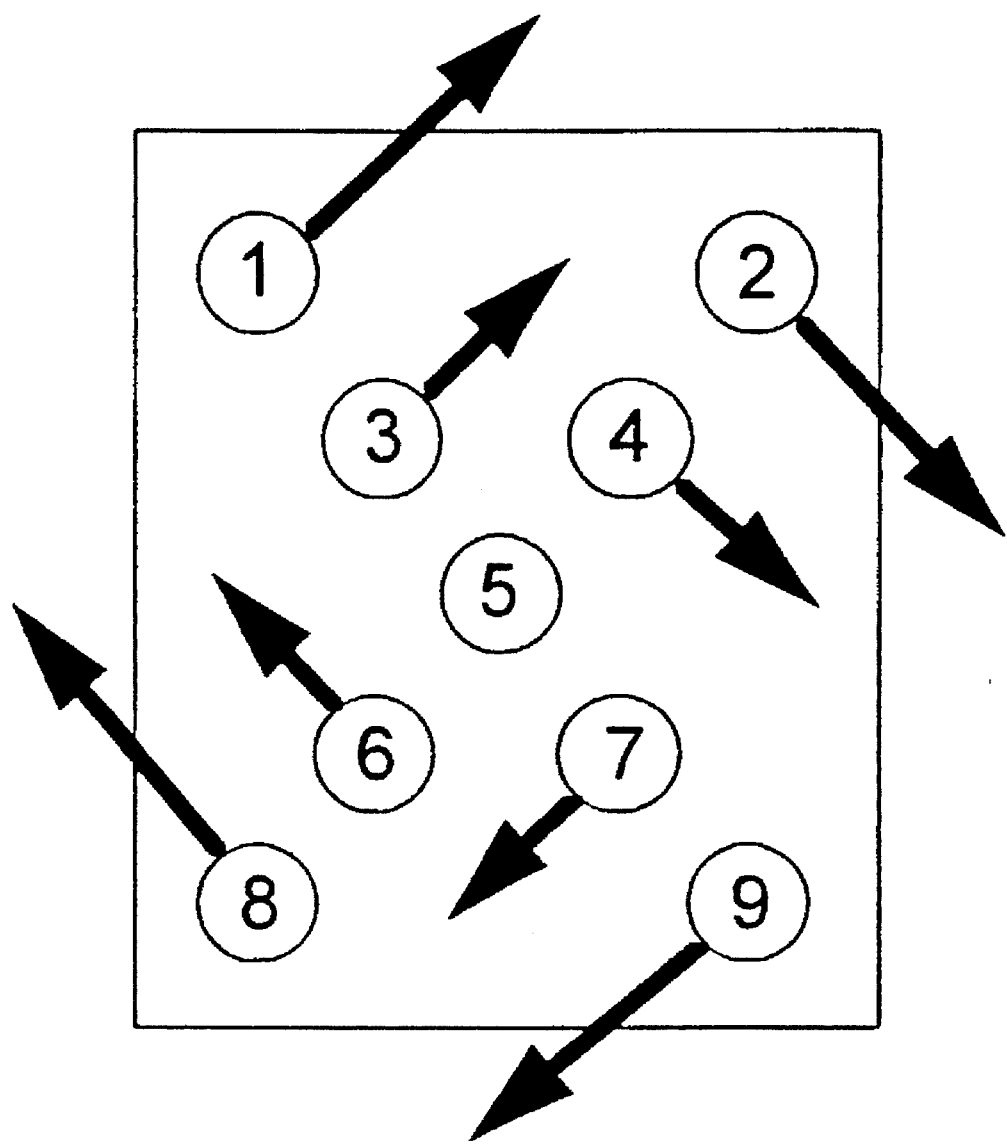
FIG. 11 is an illustration of reconstruction of an image having a rotation distortion.

Reference is now made to FIG. 11, which illustrates the error vectors of the targets of an image which is distorted by rotation about its center. It is appreciated that the rotation distortion may be superimposed on the distortions of the scrambled image of FIG. 10A or any other distortions encountered in the received image to be reconstructed.

It is to be appreciated that normally a relatively large number of targets are employed in an image, preferably at least about 5% of the number of gixels defined for scrambling.

Figure 12A:
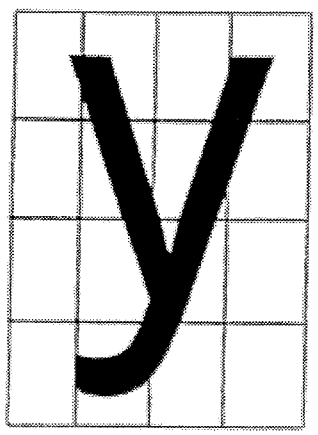
FIGS. 12A, 12B, 12C, 12D and 12E together constitute an illustration of one embodiment of target insertion, image reconstruction and document scrambling in accordance with one embodiment of the present invention.
Figure 12B:
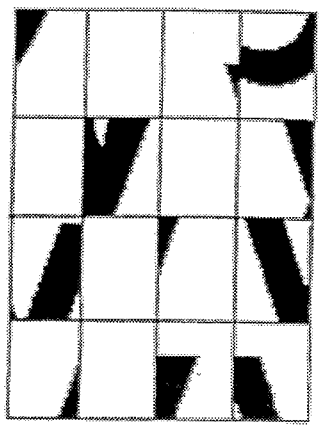
Figure 12C:
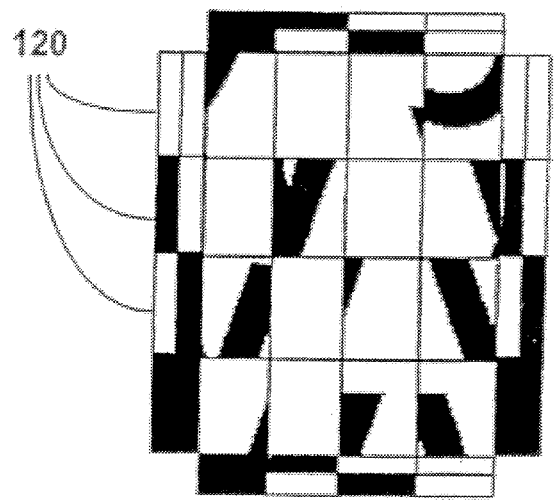

Reference is now made to FIGS. 12A–12E, which illustrate target insertion, image reconstruction and document scrambling employing peripheral targets. FIG. 12A shows an original image and FIG. 12B shows a scrambled image. FIG. 12C shows peripheral binary coded targets 120 arranged along the periphery of the scrambled image.

Figure 12D:
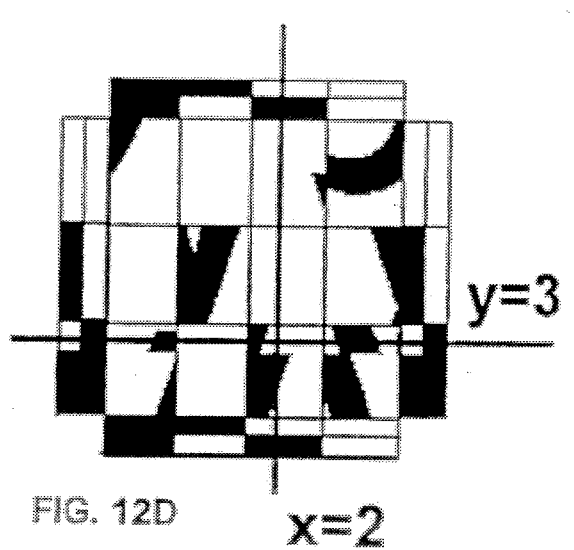
Figure 12E:
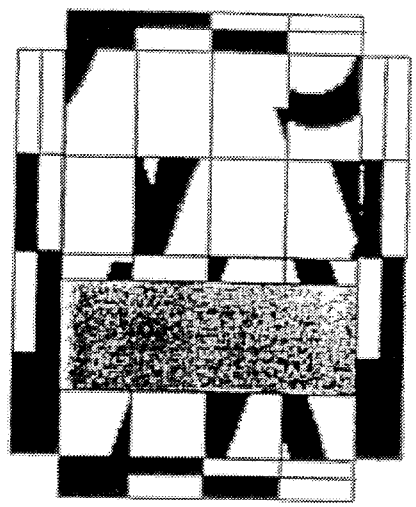

FIG. 12D illustrates a received scrambled image having missing rows, prior to reconstruction. FIG. 12E shows a reconstructed image, wherein the grey portion represents missing information. The reconstruction may be carried out using the methodology described hereinabove with respect to FIGS. 4A–11 wherein target identification is carried out according to the binary coding.

Figure 13A:
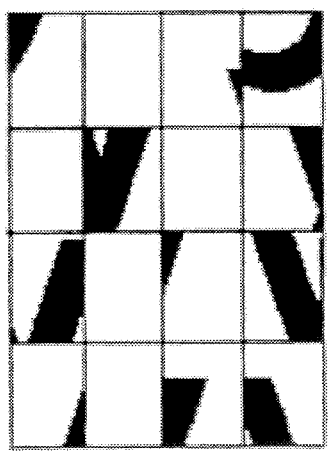
FIGS. 13A, 13B, 13C, 13D and 13E together constitute an illustration of one embodiment of target insertion, image reconstruction and document scrambling in accordance with another embodiment of the present invention.
Figure 13B:
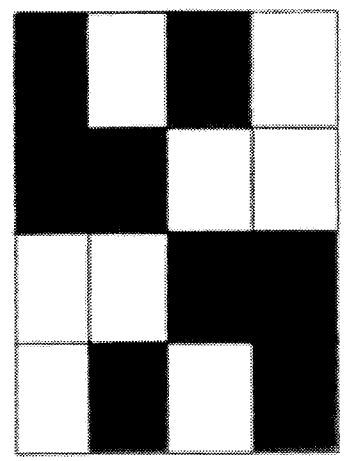
Figure 13C:
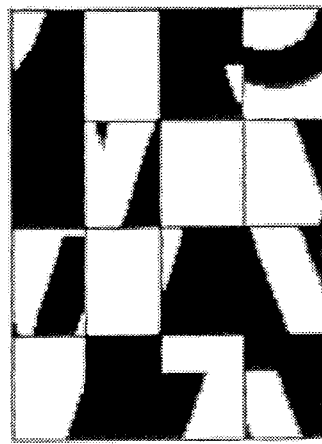

Reference is now made to FIGS. 13A–13E, which illustrate target insertion, image reconstruction and document scrambling employing selected gixel reversal. FIG. 13A shows an scrambled image and FIG. 13B shows a pattern of gixels to be reversed (black-white reversal). FIG. 13C shows the scrambled image of FIG. 13A having selected gixels thereof reversed according to the pattern of FIG. 13B. Generally reversed gixels can be recognized by the percentage of white or black therein.

Figure 13D:
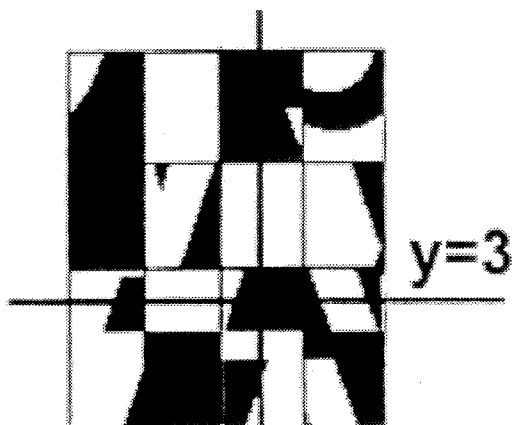
Figure 13E:
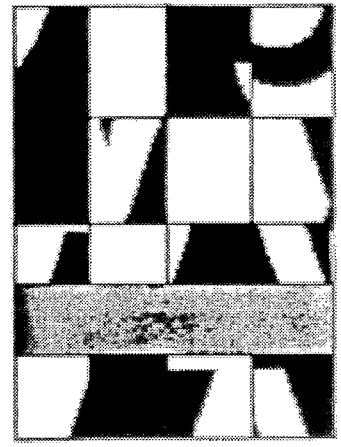

FIG. 13D illustrates a received scrambled image corresponding to that of FIG. 13C having missing rows, prior to reconstruction. FIG. 13E shows a reconstructed image, wherein the grey portion represents missing information.

The reconstruction may be carried out using the methodology described hereinabove with respect to FIGS. 4A–11, modified so as to identify the targets as reversed gixels.

Figure 14A:
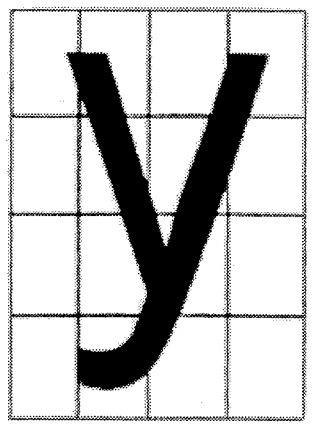
FIGS. 14A, 14B, 14C, 14D and 14E together constitute an illustration of one embodiment of target insertion, image reconstruction and document scrambling in accordance with yet another embodiment of the present invention.
Figure 14B:
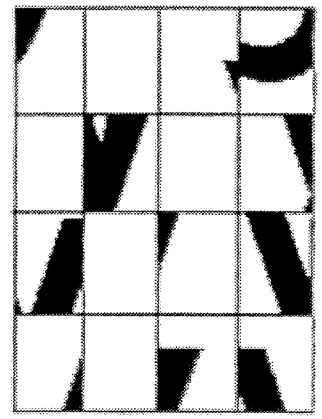
Figure 14C:
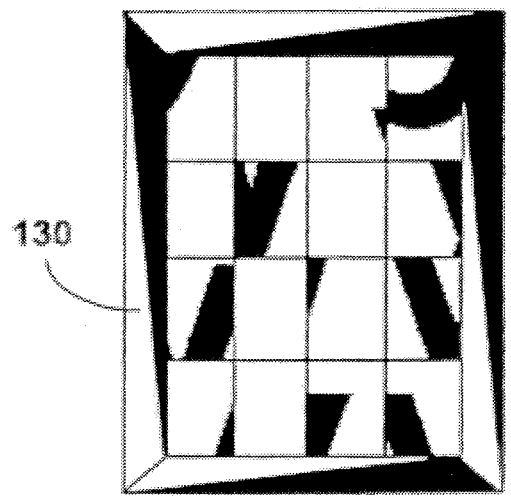

Reference is now made to FIGS. 14A–14E, which illustrate target insertion, image reconstruction and document scrambling employing peripheral targets in accordance with a further alternative embodiment of the present invention. FIG. 14A shows an original image and FIG. 14B shows a scrambled image. FIG. 14C shows peripheral targets 130 arranged along the periphery of the scrambled image. The targets have a varying white/black ratio which enables their X and Y coordinates to be determined.

Figure 14D:
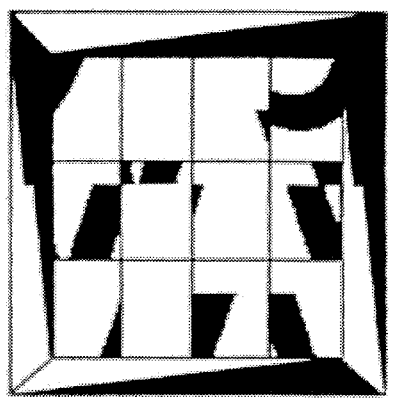
Figure 14E:
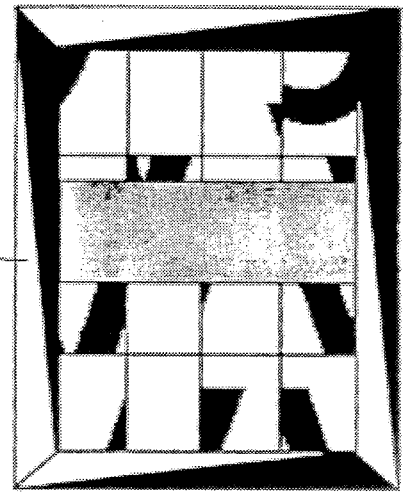

FIG. 14D illustrates a received scrambled image having missing rows, prior to reconstruction. FIG. 14E shows a reconstructed image, wherein the grey portion represents missing information. The reconstruction may be carried out using the methodology described hereinabove with respect to FIGS. 4A–11 wherein target identification is carried out according to the sensed white/black ratio.

It will be appreciated by persons skilled in the art that the present invention is not limited by what has been particularly shown and described hereinabove. Rather the scope of the present invention is defined only by the claims which follow:

I claim:

1. Apparatus for descrambling documents comprising:

a scrambled document signal source, providing signals that represent the contents of a document, receiving a document to be unscrambled and providing output signals representing the contents of the document;

an unscrambler for operating on the output signals to produce modified output signals representing an unscrambled version of the document, the unscrambler employing a system of reference marks, positioned interior of the periphery of at least a portion of the content bearing area of the document, to correct distortion; and an unscrambled document generator receiving said modified output signals and producing a unscrambled version of the document.

2. Apparatus according to claim 1 and also comprising a descrambling verifier for verification of correct descrambling.

3. Apparatus for descrambling documents comprising:

a scrambled document signal source, providing signals that represent the contents of a document, receiving a document to be unscrambled and providing output signals representing the contents of the document;

an unscrambler for operating on the output signals to produce modified output signals representing an unscrambled version of the document, the unscrambler employing a system of reference marks, to correct distortion; and an unscrambled document generator receiving said modified output signals and producing a unscrambled version of the document, the apparatus also comprising a descrambling verifier for verification of correct descrambling, and wherein said descrambling verifier comprises an edge correlator for carrying out edge correlation operations on adjacent scrambled pixels.

4. Apparatus according to claim 1 and wherein said unscrambler is controlled by a coded input to provide a selected one from a plurality of possible modifications to the output signals.

5. Apparatus according to claim 1 when embodied in a photocopier.

6. Apparatus according to claim 1 when embodied in a telefax.

7. Apparatus according to claim 1 when embodied in a computer.

8. Apparatus according to claim 1 and wherein said unscrambler is operative to change the relative positions of multi-pixel regions of a document, without modifying the information content within each of the multi-pixel regions.

9. Apparatus according to claim 1 and wherein said unscrambler is operative to leave unchanged certain predetermined regions of the document.

10. Apparatus for descrambling documents for use in conjunction with a document receiver and a scrambled document signal source receiving a document to be unscrambled and providing output signals representing the contents of the document, the apparatus comprising:

an unscrambler operating on the output signals to produce modified output signals representing an unscrambled version of the document, the unscrambler employing a system of reference marks, positioned interior of the periphery of at least a portion of the content bearing area of the document, to correct distortion; and to provide the modified output signals to the document generator, for producing an unscrambled version of the document.

11. A method for descrambling documents comprising the steps of:

receiving a document to be unscrambled including a content bearing area and a system of reference marks positioned interior of the periphery of at least a portion of the content bearing area of the document and providing output signals representing the contents of the document;

operating on the output signals to produce modified output signals representing an unscrambled version of the document;

employing said system of reference marks to correct distortion; and receiving said modified output signals and producing a corrected unscrambled version of the document.

12. A method according to claim 11 and wherein said reference marks are distributed throughout the area of the document.

13. A method according to claim 11 and wherein said reference marks are distributed about the periphery of the area of the document.

14. A method according to claim 11 and wherein the correct location of each of said reference marks is determined by its appearance.

15. A method according to claim 11 and wherein said reference marks are characterized by a local color modification of the image information thereat.

16. A method according to claim 11 and wherein said reference marks are arranged in a predetermined grid.

17. Apparatus according to claim 1 and wherein said reference marks are distributed throughout the area of the document.

18. Apparatus according to claim 1 and wherein said reference marks are distributed about the periphery of the area of the document.

19. Apparatus according to claim 1 and wherein the correct location of each of said reference marks is determined by its appearance.

20. Apparatus according to claim 1 and wherein said reference marks are characterized by a local color modification of the image information thereat.

21. Apparatus according to claim 1 and wherein said reference marks are arranged in a predetermined grid.

22. A method for descrambling documents for use in conjunction with a document receiver and a scrambled document signal source receiving a document to be unscrambled and providing output signals representing the contents of the document, the method comprising the steps of:

operating on the output signals to produce modified output signals representing an unscrambled version of the document;

employing a system of reference marks, positioned interior of the periphery of at least a portion of the content bearing area of the document, to correct distortion; and providing the modified output signals to the document generator, for producing an unscrambled version of the document.

* * * * *